(12) United States Patent  
Yui et al.

(10) Patent No.: US 6,294,850 B1  
(45) Date of Patent: Sep. 25, 2001

(54) SMALL-SIZED MOTOR

(75) Inventors: Toshiya Yui; Kenji Furuya, both of Matsudo (JP)

(73) Assignee: Mabuchi Motor Co., Ltd. (JP)

( * ) Notice: Subject to any disclaimer, the term of this patent is extended or adjusted under 35 U.S.C. 154(b) by 0 days.

(21) Appl. No.: 09/491,776

(22) Filed: Jan. 26, 2000

(30) Foreign Application Priority Data

Jan. 29, 1999 (JP) ................................................. 11-021213

(51) Int. Cl.$^7$ ................................................. H01R 39/38
(52) U.S. Cl. ................................. 310/40 MM; 310/239; 29/597; 29/826
(58) Field of Search ............................. 310/40 MM, 239, 310/154, 242, 43, 89, 91, 71; 29/596–598, 826

(56) References Cited

U.S. PATENT DOCUMENTS

| 3,654,504 | * | 4/1972 | Susdorf et al. ....................... 310/239 |
| 3,735,172 | * | 5/1973 | Battaglia et al. ..................... 310/239 |
| 3,745,393 | * | 7/1973 | Spors ................................... 310/239 |
| 4,626,178 | * | 12/1986 | Terumoto ............................. 417/366 |
| 4,965,478 | * | 10/1990 | Kobayashi et al. .................. 310/249 |
| 5,070,269 | * | 12/1991 | Tamaki et al. ........................ 310/171 |
| 5,089,735 | * | 2/1992 | Sawaguchi et al. .................... 310/88 |
| 5,280,210 | * | 1/1994 | Kress et al. ........................... 310/249 |
| 5,481,150 | * | 1/1996 | Tanaka et al. ........................ 310/158 |
| 5,608,280 | * | 3/1997 | Tamemoto et al. .................. 310/239 |
| 6,160,329 | * | 12/2000 | Ng ................................. 310/40 MM |

FOREIGN PATENT DOCUMENTS 0510 984 A1 * 10/1992 (EP) .  
2000224815 * 1/1999 (JP) .

* cited by examiner

*Primary Examiner*—Joseph Waks  
(74) *Attorney, Agent, or Firm*—McGlew and Tuttle, P.C.

(57) ABSTRACT

A small-sized motor includes an insulation holder (16) which is integrally molded from a synthetic resin. The insulation holder (16) includes a cover portion (13) for-covering the casing cover (5) from the outside thereof, and a pair of brush holders (12) which project from the cover portion (13) into the interior of the motor, while passing through cut portions formed in the casing cover (5). Each of the brush holder (12) supports a brush arm (17) and an input terminal (11) connected thereto. The brush arm (17) supports a brush (18). Bearings (3) and (6) for the shaft are respectively supported at the center of the bottom portion of the casing (2) and at the center of the casing cover (5). Thus, it becomes possible to realize stable bearing alignment and to provide insulation outside the motor to thereby enable attachment of an electrical element to the motor without use of any additional insulation means.

2 Claims, 3 Drawing Sheets

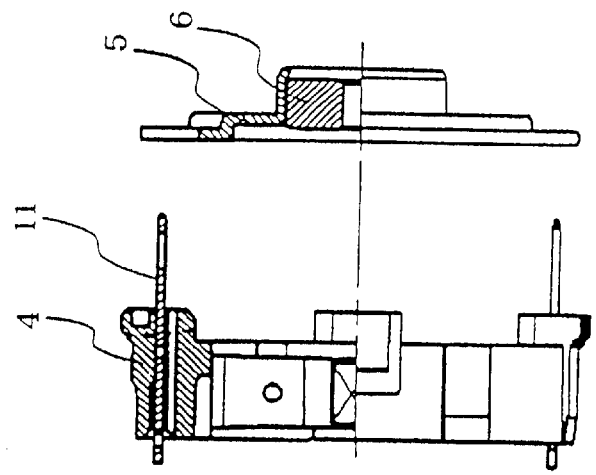
FIG.4C (PRIOR ART)
FIG.4B (PRIOR ART)
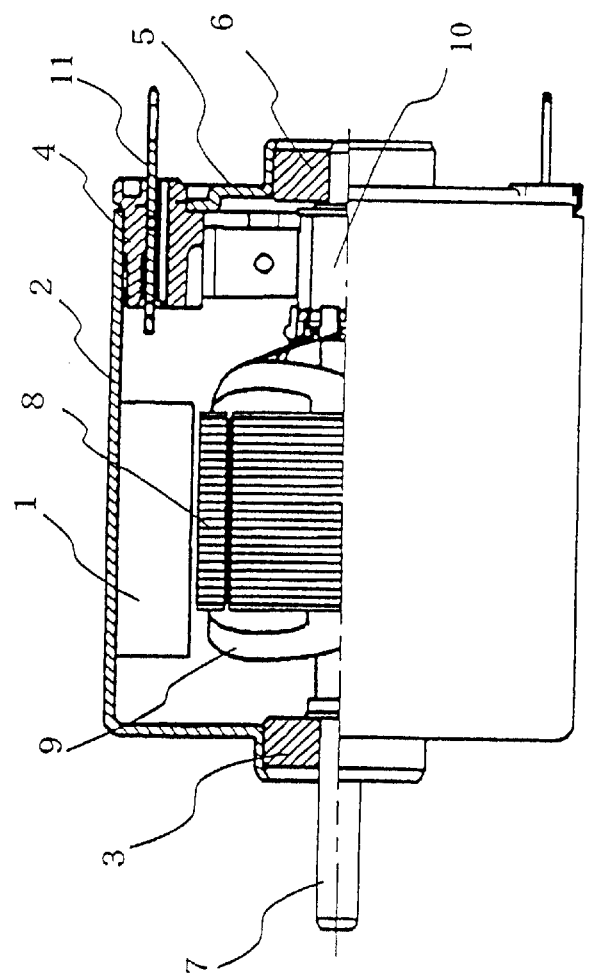
FIG.4A (PRIOR ART)

SMALL-SIZED MOTOR

TECHNICAL FIELD

The present invention relates to a small-sized motor and particularly to a small-sized motor which realizes stable bearing alignment through use of a metallic casing cover and which secures insulation outside the casing cover in order to enable direct attachment of an electrical element, such as a capacitor, to the motor.

BACKGROUND ART

In the case of a small-sized fan motor used in a drier or the like, an electrical element, such as a capacitor, diode, or choke coil, is required to be attached direct to the outer surface of the motor. However, since the end bell of a conventional small-sized motor is designed such that a metallic casing cover is exposed to the outside of the motor, an electrical element cannot be attached to the outer surface of the motor unless insulation is provided between the electrical element and the casing cover.

FIG. 4 shows such a conventional small-sized motor having a metallic casing cover, wherein the overall structure of the motor is shown on the leftmost side with the upper half of the motor shown in cross section; an end bell formed of a synthetic resin and removed from the casing is shown on the right side thereof; and a casing cover is shown on the rightmost side. Magnets 1 are attached to the inner surface of a casing 2, which is formed of a metallic material and into a closed-bottomed cylindrical shape. A casing cover 5 is fitted to the casing 2 so as to close an opening portion of the casing 2. A bearing 6 for a shaft 7 is mounted at a central portion of the casing cover 5. The other end of the shaft 7 is supported by a bearing 3, which is disposed at the center of a bottom portion of the casing 2 having a closed-bottomed cylindrical shape.

The shaft 7 is equipped with a laminated core 8, windings 9 wound around the laminated core 8, and a commutator 10, thereby forming a rotor of the small-sized motor. Brushes in contact with the commutator 10 are supported by the end bell 4. Input terminals 11 connected to the brushes extend through the casing cover 5 and are projected to the outside for electrical connection.

As described above, in the conventional small-sized motor, the metallic casing cover 5 is located outermost, and the end bell 4—which is formed of a synthetic resin and supports the brushes, the input terminals 11, and the like—is disposed on the inner side of the casing cover 5 and is fitted into the opening portion of the casing 2. Since the bearing 6 is accommodated in the center portion of the metallic casing cover 5, stable bearing alignment is secured. However, when an electrical element is to be attached to the outer surface of the metallic casing cover 5, it becomes necessary to provide a cover formed of synthetic resin, paper, or the like for insulting the electrical element from the casing cover 5.

Instead of being formed of metal, the casing cover 5 may be formed from a synthetic resin through injection molding in which the casing cover 5 is molded integrally with the end bell to thereby secure insulation. In this case, however, the accuracy of the casing cover 5 becomes inferior to that of a metallic casing cover produced through cutting work. Therefore, the accuracy in alignment of bearings disposed on the opposite sides of the motor deteriorates, so that the clearance between the shaft and each of the bearings must be increased. However, when the clearance is increased, the shaft hits the bearings due to electromagnetic force of the motor and other causes, resulting in generation of clearance noise. In order to solve the above-described problem to thereby decrease clearance noise, a spherical bearing may be employed as a self-aligning mechanism. In this case, since a part for supporting the bearing becomes necessary, cost increases.

DISCLOSURE OF THE INVENTION

An object of the present invention is to provide a small-sized motor which maintains the advantageous feature of a metallic casing cover to thereby secure stable bearing alignment and which provides insulation outside the motor to thereby enable attachment of an electrical element to the motor without use of any additional insulation means.

A small-sized motor of the present invention comprises a metallic casing 2 having a closed-bottomed cylindrical shape and including a magnet 1 attached to an inner surface thereof; a casing cover 5 fitted to the casing 2 so as to close an opening portion of the casing 2; and a rotor including a shaft 7, a laminated core 8 mounted on the shaft 7, windings 9 wound around the laminated core 8, and a commutator 10 mounted on the shaft 7. The motor further comprises an insulation holder 16 which is integrally molded from a synthetic resin. The insulation holder 16 comprises a cover portion 13 for covering the casing cover 5 from the outer side thereof, and a pair of brush holders 12 which project from the cover portion 13 into the interior of the motor, while passing through cut portions formed in the casing cover 5. Each of the brush holder 12 supports a brush arm 17 and an input terminal 11 connected thereto. The brush arm 17 supports a carbon brush 18. Bearings 3 and 6 for the shaft are respectively supported at the center of the bottom portion of the casing 2 and at the center of the casing cover 5. Thus, stable bearing alignment is realized, and an insulating property can be imparted to the outer surface of the motor.

Further, a pair of magnet pressers 14 can be formed integrally with the insulation holder 16 such that the magnet pressers 14 project into the interior of the motor via the cut portions formed in the casing cover 5, to thereby axially position the magnet 1.

BRIEF DESCRIPTION OF DRAWINGS

FIG. 4 shows such a conventional small-sized motor, wherein the overall structure of the motor is shown on the leftmost side with the upper half of the motor shown in cross section; an end bell formed of a synthetic resin and removed from the casing is shown on the right side thereof; and a casing cover is shown on the rightmost side.

BEST MODE FOR CARRYING OUT THE INVENTION

Figure 1:
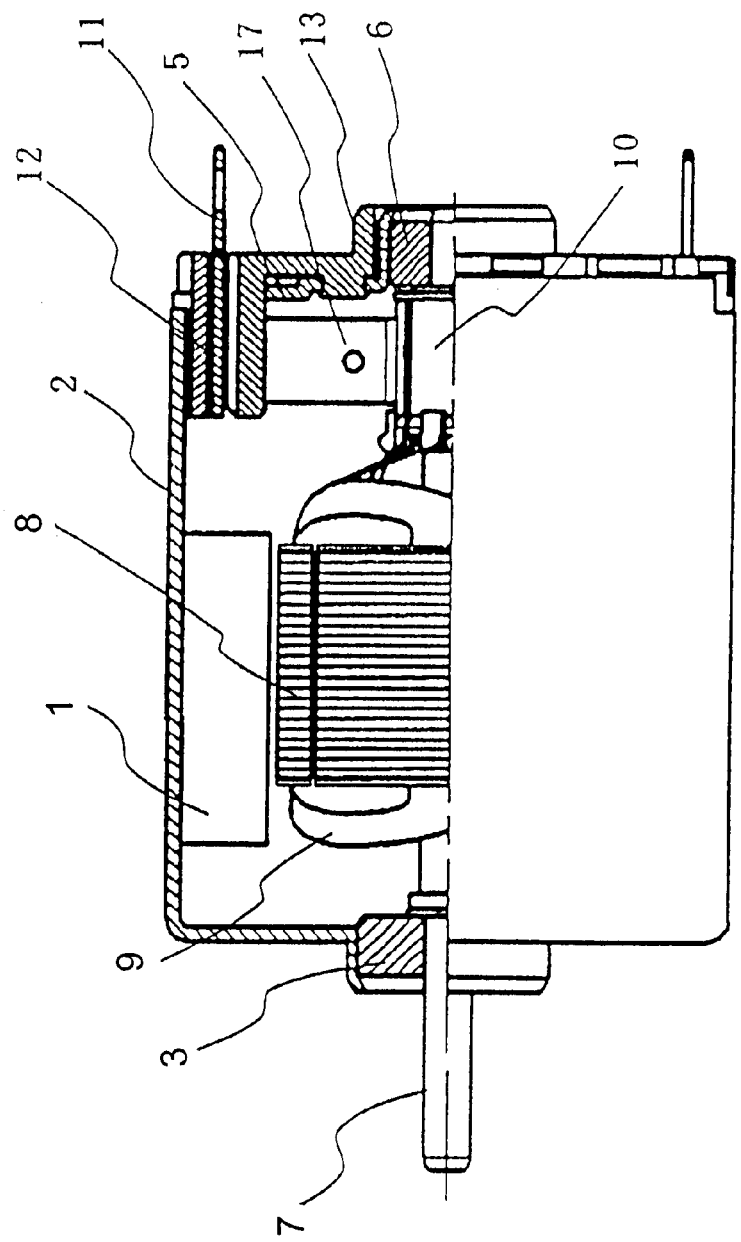
FIG. 1 is a longitudinal sectional view of a small-sized motor of the present invention, sectionally showing the upper half of the motor.

FIG. 1 is a longitudinal sectional view of a small-sized motor of the present invention, sectionally showing the upper half of the motor. The small-sized motor of the present invention is the same as that of the conventional small-sized motor described with reference to FIG. 4 except the structures of the casing cover and the insulation holder integrally fitted thereto. As shown in FIG. 1, magnets 1 are attached to the inner surface of a casing 2, which is formed of a metallic material and into a closed-bottomed cylindrical shape. A metallic casing cover 5 is fitted to the casing 2 so as to close an opening portion of the casing 2. A bearing 6 for a shaft 7 is mounted at a central portion of the casing cover 5. Since the casing cover 5 is formed of metal, the casing cover 5 can be produced accurately through press work or cutting work, so that stable bearing alignment can be realized.

The other end of the shaft 7 is supported by a bearing 3, which is disposed at the center of a bottom portion of the casing 2 having a closed-bottomed cylindrical shape. The shaft 7 is equipped with a laminated core 8, windings 9 wound around the laminated core 8, and a commutator 10, thereby forming a rotor of the small-sized motor. A pair of carbon brushes in contact with the commutator 10 have brush arms 17, each of which is supported by a brush holder 12 formed of a synthetic resin. Input terminals 11 connected to the brush arms 17 penetrate the brush holders 12 and project from the casing cover 5 for electrical connection.

Figure 2A:
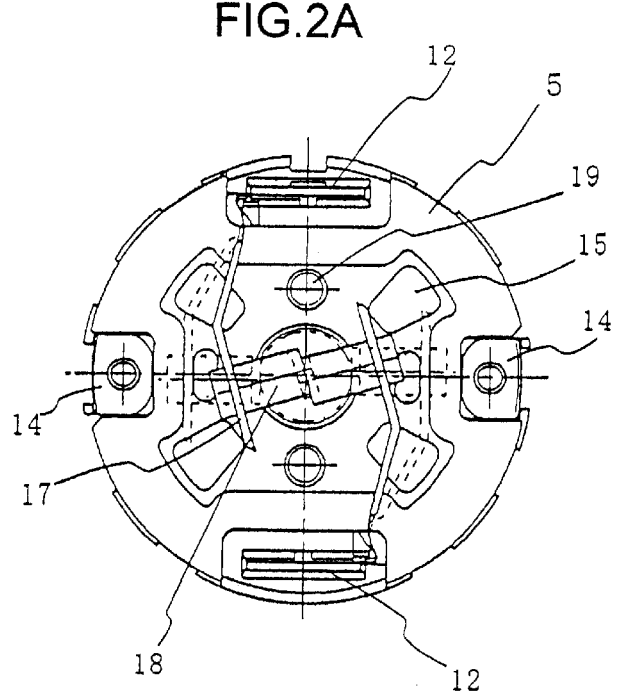
FIG. 2 shows the casing cover and the insulation holder shown in FIG. 1, wherein a cross-sectional view is shown on the right side, and a view as viewed from the interior of the motor toward the casing cover is shown on the left side.
Figure 2B:
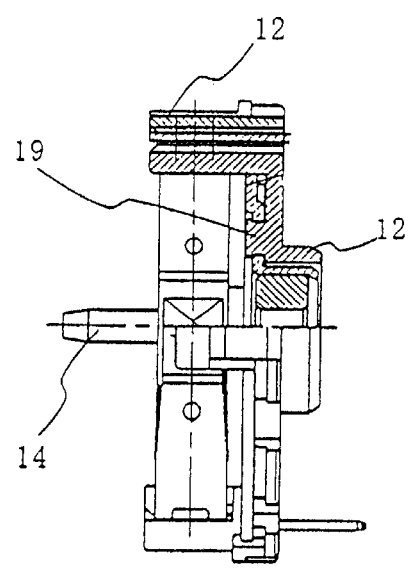
Figure 3A:
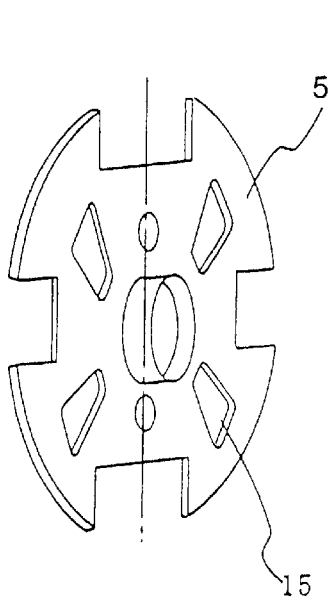
FIG. 3 is a schematic exploded view of the casing cover and the insulation holder, in which details of the structure are omitted.
Figure 3B:
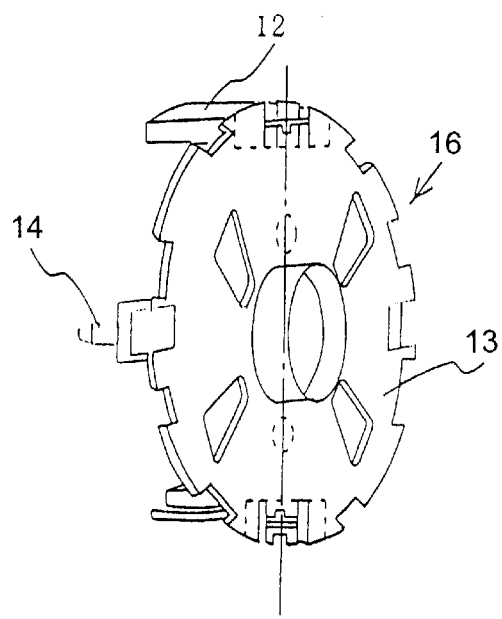

FIG. 2 shows the casing cover and the insulation holder of the small-sized motor shown in FIG. 1, wherein a cross-sectional view is shown on the right side, and a view as viewed from the interior of the motor toward the casing cover is shown on the left side. FIG. 3 is a schematic exploded view of the casing cover and the insulation holder, in which details of the structure are omitted in order to clarify the mutual relationship between the casing cover and the insulation holder. The metallic casing cover 5 generally has a circular shape suitable for attachment to the opening portion of the casing 2. The metallic casing cover 5 has cut portions into which the upper and lower brush holders 12 and right and left magnet pressers 14 are fitted, a center hole for receiving a shaft bearing, and a plurality of ventilation openings 15 for cooling purpose.

The insulation holder 16 formed of synthetic resin and integrally fitted to the metallic casing cover 5 has a cover portion 13, the upper and lower brush holders 12, and the right and left magnet pressers 14, which are integrally formed from synthetic resin. The cover portion 13 generally has a circular shape corresponding to the shape of the casing cover 5. The cover portion 13 is constructed to cover the casing cover 5 from the outer side thereof and has openings and holes formed at positions corresponding to those of the ventilation openings 15 and the bearing receiving hole of the metallic casing cover The pair of brush holders 12 project into the interior of the motor via the cut portions at the outer circumferential portion of the casing cover 5 and support the brush arms 17 and the input terminals 11 connected thereto. The pair of magnet pressers 14 are desirably provided in order to axially press and position the magnets 1. Similarly to the case of the brush holders, the magnet pressers 14 project into the interior of the motor via the cut portions at the outer circumference of the casing cover 5. Reference numeral 19 in FIG. 2 denotes cylindrical projections which are formed integrally with the insulation holder and which are fitted into corresponding holes of the casing cover 5 for more reliable assembly.

The insulation holder 16 having the above-described structure is integrated with the brush holders 12 and the magnet pressers 14 such a manner that the brush holders 12 and the magnet pressers 14 are fitted into the cut portions at the outer circumferential portion of the casing cover 5 from the outer side thereof by use of elastic force of the synthetic resin. Further, the thus-integrated casing cover 5 and the insulation holder 16 are fitted to the opening portion of the casing 2 into which the rotor has been inserted. Thus, the assembly of the motor is completed. As described above, since the outer surface of the metallic casing cover 5 is covered with the cover portion 13 of the insulation holder 16 formed of synthetic resin, an electrical component can be attached to the outer surface of the casing cover 5 without use of an additional insulating means.

INDUSTRIAL APPLICABILITY

As described above, the motor according to the present invention comprises the insulation holder 16 which is integrally formed from synthetic resin and which includes a cover portion 13 for covering the casing cover 5 from the outside thereof, and the pair of brush holders 12 which project from the cover portion 13 into the interior of the motor via the cut portions provided in the casing cover 5. Therefore, it becomes possible to maintain an advantageous feature of the metallic casing cover to thereby secure stable bearing alignment and to provide insulation outside the motor to thereby enable attachment of an electrical element to the motor without use of any additional insulation means.

What is claimed is:

1. A small-sized motor comprising: a metallic casing having a closed-bottomed cylindrical shape and including a magnet attached to an inner surface thereof; a metallic casing cover fitted to the casing so as to close an opening portion of the casing; and a rotor including a shaft, a laminated core, windings wound around the laminated core, and a commutator mounted on the shaft, wherein the motor further comprises an insulation holder integrally molded from a synthetic resin, the insulation holder having a cover portion for covering the casing cover from the outer side thereof, and a pair of brush holders which project from the cover portion into the interior of the motor, while passing through cut portions formed in the casing cover;

each of the brush holders supports a brush arm and an input terminal connected thereto, the brush arm supporting a brush;

bearings for the shaft are respectively supported at the center of the bottom portion of the casing and at the center of the casing cover.

2. A small-sized motor according to claim 1, wherein a pair of magnet pressers are formed integrally with the insulation holder such that the magnet pressers project into the interior of the motor via the cut portions formed in the casing cover, to thereby axially position the magnet.

* * * * *